UNITED STATES PATENT OFFICE.

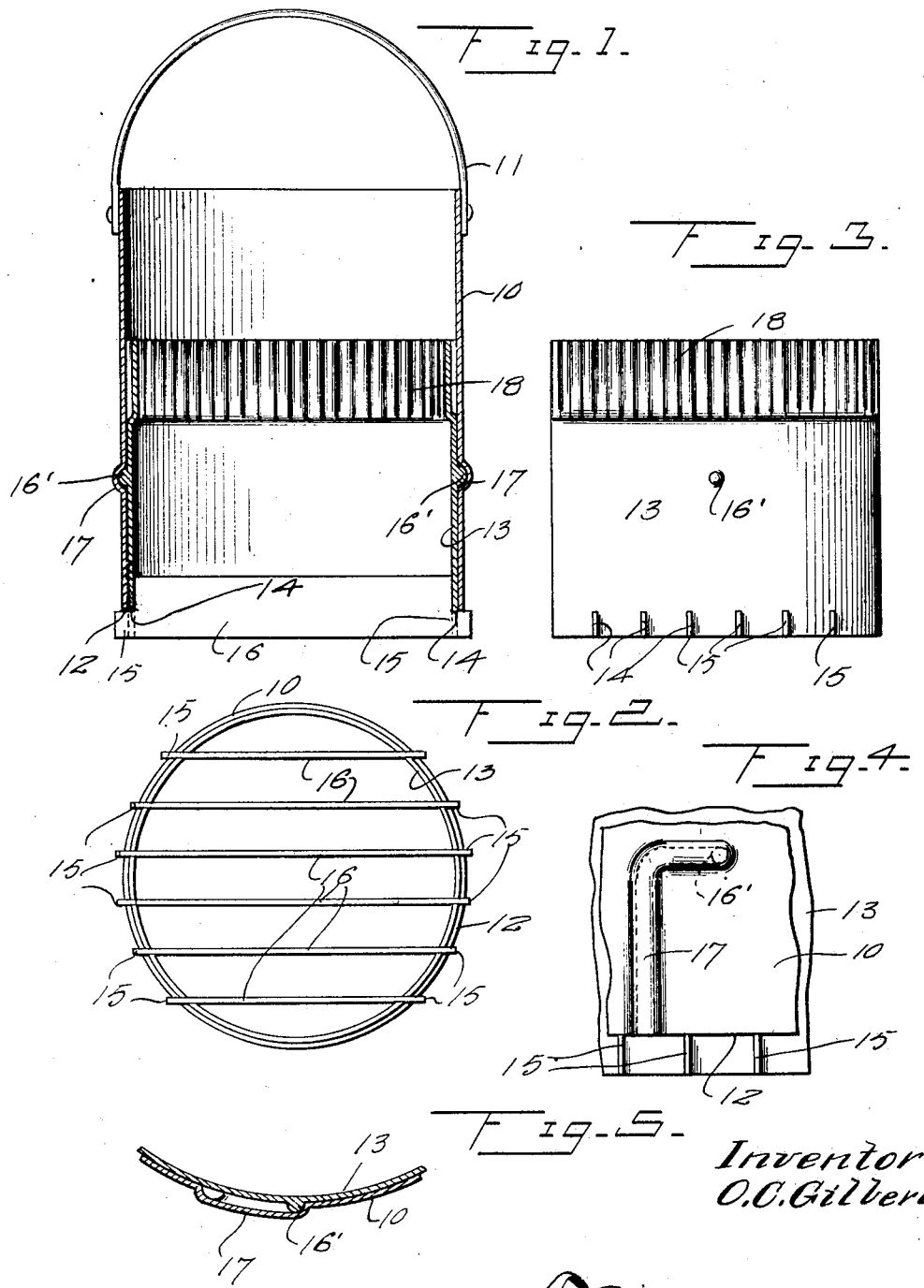

OTIS C. GILBERT, OF VIRGINIA, MINNESOTA.

VEGETABLE AND PASTRY CUTTER.

1,371,158.  Specification of Letters Patent.  Patented Mar. 8, 1921.

Application filed October 22, 1919. Serial No. 332,415.

*To all whom it may concern:*

Be it known that I, OTIS C. GILBERT, a citizen of the United States, residing at Virginia, in the county of St. Louis and State of Minnesota, have invented certain new and useful Improvements in Vegetable and Pastry Cutters; and I do hereby declare the following to be a full, clear, and exact description of the invention, such as will enable others skilled in the art to which it appertains to make and use the same.

This invention relates to kitchen utensils or tools, and the primary object of the invention is to provide an improved vegetable and pastry cutter.

An important object of this invention is to provide a device of the class described having novel means for cutting vegetables, meat, and pastry.

A further object of the invention is to provide a device of the class described including an outer cylinder and an inner cylinder adapted to coöperate with the outer cylinder and provided with novel means whereby the same may be connected to the outer cylinder.

A further object of the invention is to provide a device of the class described which is simple, durable and desirable in use.

Other objects and advantages will be apparent during the course of the following description.

In the accompanying drawing forming a part of this application and in which like numerals are employed to designate like parts throughout the same, Figure 1 is a vertical section through a device embodying my invention, Fig. 2 is a bottom plan view of the same, Fig. 3 is a side elevation of an inner detachable cylinder embodied in the invention, Fig. 4 is a fragmentary elevation of the device illustrating the connecting means between the inner and outer cylinders, and, Fig. 5 is a fragmentary section through the device.

In the drawing wherein for the purpose of illustration is shown a preferred embodiment of my invention, the numeral 10 designates an outer cylinder provided with a handle 11. A cutting edge 12 is provided on the bottom of the cylinder 10 and is adapted for shaping biscuits or other food made from dough.

The device can be effectively used for chopping slaw, cutting up cold potatoes, cutting hash and the like and can also be used for stirring food in a pan while reheating or warming.

An inner cylinder 13 is provided at one end with a plurality of transverse openings 14 receiving the end portions 15 of spaced parallel cutting blades 16. The cutting blades 16 are adapted for slicing raw potatoes and have their end portions reduced and projected beyond the lateral surfaces of the inner cylinder 13 and engaging the lower edge 12 of the outer cylinder 10, to limit the downward movement thereof. A pair of diametrically opposed locking pins 16' are carried by the inner cylinder 13 and are adapted to be received within L-shaped slots 17 formed in the outer cylinder 10. When the locking pins 16' are inserted within the horizontal arms of the L-shaped slots 17, the end portions of the blades 15 engage the lower side of the cylinder 10 and thereby relieve all strain from the locking pins 16' and the slots 17.

If desired, the inner cylinder 13 may be used independently of the outer cylinder for cutting cakes and the like. One end portion of the cylinder 13 is provided with circumferential corrugations 18 adapted for putting a fancy edge on the cakes.

When the cylinder 13 is inserted within the outer cylinder 10, the blades 15 are employed for slicing raw potatoes, the end portions of the blades 15 serve to relieve all strain on the locking pins 16' and the L-shaped slots 17. This renders the device particularly durable since devices of this class are necessarily made of light material and a reliable locking means between the parts is highly desirable. The device is adapted for cutting a whole potato at one time.

While I have shown and described the preferred embodiment of my invention, it is understood that such minor changes in arrangement and construction of parts may be made as will remain within the spirit of the invention and the scope of what is claimed.

Having thus described my invention, what I claim is:—

1. A device of the class described comprising an outer cylinder having a cutting edge provided with diametrically opposite pairs of recesses, an inner cylinder carrying cutting blades having extensions for engagement in said recesses of the outer cylinder when the inner cylinder is inserted in the outer cylinder, and means for locking said inner cylinder in position within said outer cylinder.

2. A device of the class described comprising an outer cylinder having a cutting edge provided with diametrically opposite recesses, an inner cylinder having a cutting edge at one end and transverse blades at its opposite end, said blades having extensions at their end portions for engagement in the recesses of the cutting edge of the outer cylinder when the inner cylinder is inserted in said outer cylinder, and means for locking said inner cylinder in position within said outer cylinder.

3. A device of the class described comprising an outer cylinder having a handle at one end and a cutting edge at its opposite end, said cutting edge being provided with diametrically opposite series of recesses, an inner cylinder adapted for engagement in said outer cylinder and having a serrated cutting edge, cutting blades mounted in the opposite end of said inner cylinder, and having extended ends for engagement in the recesses of the cutting edges of said outer cylinder, and means for releasably locking said inner cylinder in position within said outer cylinder.

In testimony whereof I affix my signature in presence of two witnesses.

OTIS C. GILBERT.

Witnesses:
A. E. SHIPLEY,
GEO. LEANNA.